United States Patent [19]

Brongo

[11] 3,999,775
[45] Dec. 28, 1976

[54] ROLLABLE CART

[75] Inventor: Louis Joseph Brongo, Kingston, Pa.

[73] Assignee: Metropolitan Wire Corporation, Wilkes-Barre, Pa.

[22] Filed: Aug. 7, 1975

[21] Appl. No.: 602,656

[52] U.S. Cl. .............................. 280/79.2; 211/187; 280/79.3
[51] Int. Cl.² .......................................... B62B 3/02
[58] Field of Search ............ 280/79.2, 79.3, 47.35, 280/47.41; 211/148, 126

[56] References Cited
UNITED STATES PATENTS

| | | | |
|---|---|---|---|
| 681,098 | 8/1901 | Brown | 280/79.3 X |
| 1,026,771 | 5/1912 | Riederer | 280/79.3 X |
| 1,427,388 | 9/1922 | Holley | 280/79.3 X |
| 2,623,642 | 12/1952 | Looney | 280/79.3 X |
| 3,199,683 | 8/1965 | Graswich | 211/126 X |
| 3,338,423 | 8/1967 | Wellman, Jr. | 211/148 X |
| 3,877,395 | 4/1975 | Sobel | 211/148 X |

*Primary Examiner*—Robert R. Song
*Assistant Examiner*—Michael J. Forman
*Attorney, Agent, or Firm*—Friedman, Goodman & Teitelbaum

[57] ABSTRACT

A rollable cart that may be readily assembled from a knock-down condition using conventional fasteners and tools and with a minimum of skill is disclosed. The rollable cart includes a chassis having a pair of pivotable, relatively small front wheels and a pair of larger, rear wheels. A three-sided housing defined by a front, a rear and a side panel is mounted on the chassis. The fourth side is open so that articles may be placed into and taken out of the housing. Side edges of the front and rear panels and the side panel are provided with a plurality of vertically spaced apart L-shaped notches. A plurality of shelves each having front and rear pairs of downwardly opened notches is also provided. The shelves may be adjustably positioned in the housing by transverse front and rear bars on which the shelves rest. The ends of the transverse bars are received in the L-shaped notches of the front, rear and side panels, which L-shaped notches are in registry with one another. The combination of the L-shaped notches and the transverse bars also provide for coupling securement of the front and rear panels to the side panel. The housing may also include a tray at the upper end thereof, a handle at the rear end thereof, hanger members at the forward end thereof and platforms at the lower, forward and rear ends thereof.

18 Claims, 11 Drawing Figures

ROLLABLE CART

BACKGROUND OF THE INVENTION

This invention relates generally to rollable, article carriers or the like and more particularly to a rollable cart, as well as an improved shelf arrangement therefor for supporting a plurality of articles.

It is well known to provide a rollable cart for supporting a plurality of articles therein. However, features of the present invention include a simplified placement of the shelves and ease of assembly, as well as low cost of manufacture, which are not disclosed in the prior art. The rollable cart comprising the present invention may be shipped in a knocked-down condition rather than in a partially or fully assembled conditions as required in the prior art.

SUMMARY OF THE INVENTION

The present invention provides a rollable cart that may be readily assembled fron a knocked-down condition, including a chassis having front and rear ends on which are mounted front and rear pairs of wheels. The pair of rear wheels are relatively large while the pair of front wheels are relatively small and are pivotally mounted so that the cart may be readily steered. A three-sided housing that is mounted on the chassis includes upwardly extending, opposed front and rear panels and a single, side panel extending between the front and rear panels. At least one shelf and preferably a plurality of shelves are mounted in the housing and are readily adjustable in a vertical direction. The shelves extend between the front and rear panels and along the side panel so that various articles may be placed upon the shelves. Novel means are provided for coupling the side panel to opposed side edges of the front and rear panels. The coupling means also support the opposed, forward and rear ends of the shelves. The coupling means are comprised of a plurality of vertically spaced apart, L-shaped notches spaced along the side edges of the front, rear and side panels with the L-shaped notches of the side panel being registered with the L-shaped notches in the adjacent side edges of the front and rear panels. The shelves, which have downwardly extending side edges, are formed with downwardly open notches that releasably engage transversely extending bars, the ends of the bars are also positioned in the L-shaped notches in the front, rear and side panels. Preferably, the side edges of the front and rear panels are box shaped and the side edges of the side panel are L-shaped such that one side edge of each of the front and rear panels nests in the L-shaped side edges of the side panel.

A tray having a recessed bottom wall may be mounted on and secured to the upper ends of the front, rear and side panels. A base wall secured to the front, rear and side panels, proximate the lower ends thereof, may also be provided with the base wall being secured to the chassis. Front and rear platforms may also be secured to the chassis proximate the forward and rear ends thereof while a handle may be secured to the rear panel and a hanger secured to the front panel.

Accordingly, it is an object of the present invention to provide an improved, low cost, rollable cart which overcomes the disadvantages of the prior art.

Another object of the present invention is to provide an improved, low cost, rollable cart, as described above, that may be readily assembled using conventional fastener means and conventional tools which require a minimum of skilled labor.

A further object of the present invention is to provide an improved, rollable cart that may be shipped in a knocked-down condition and which may readily be assembled as described above.

An added object of the present invention is to provide an improved, rollable cart, as described above, having adjustable shelves.

These and other objects, features and advantages of the invention will, in part, be pointed out with particularity, and will, in part, become obvious from the following more detailed description of the invention, by way of example, taken in conjunction with the accompanying drawings which form an integral part thereof.

BRIEF DESCRIPTION OF THE DRAWINGS

In the various figures of the drawings, like reference characters designate like parts. In the drawings.

DESCRIPTION OF THE PREFERRED EMBODIMENT

Figure 1:
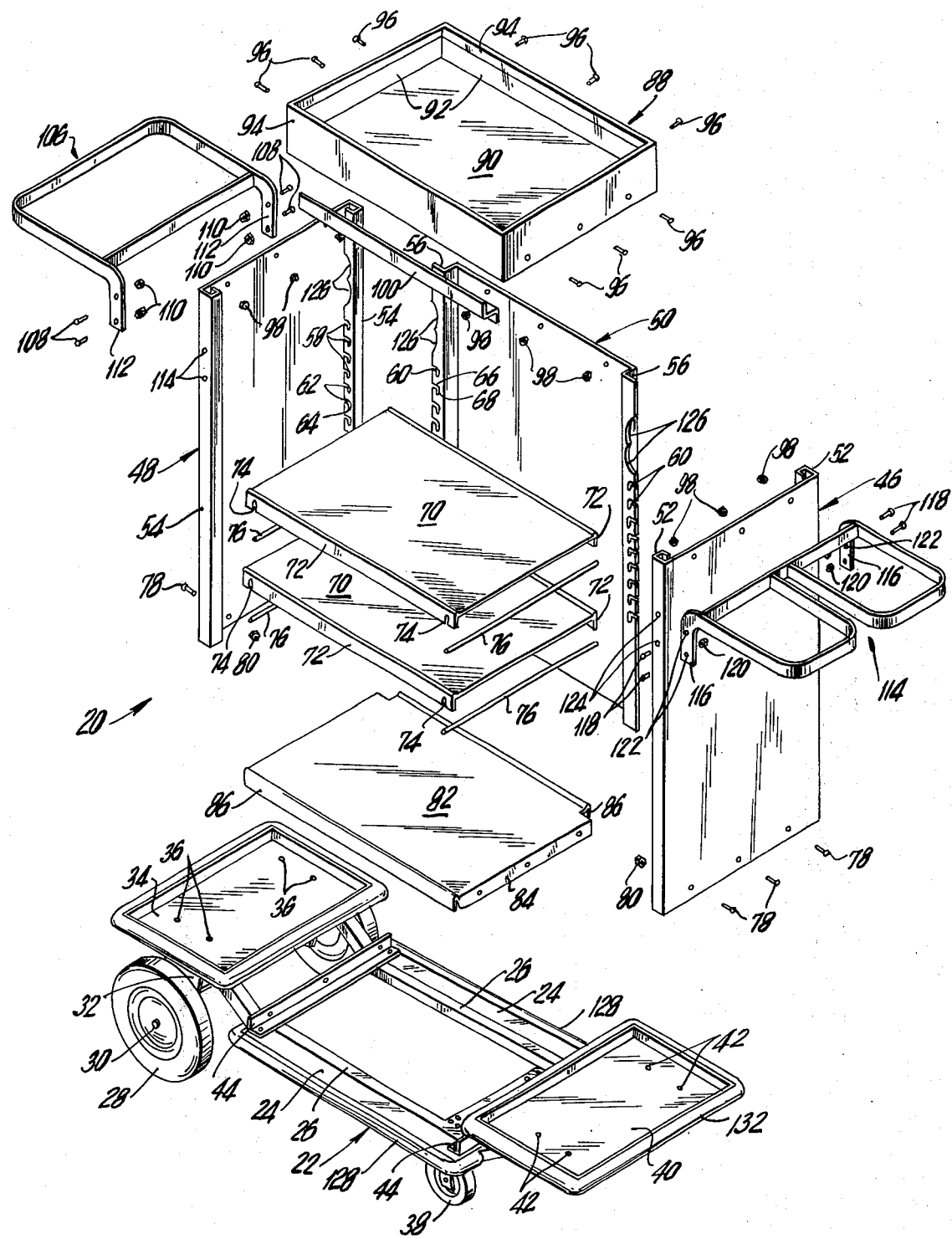
FIG. 1 is an exploded, perspective view of a rollable cart according to the present invention.

The present invention comprises an improved rollable cart 20 that includes a chassis or base member which is generally designated by the reference character 22. As shown, for example, in FIG. 1, the chassis 22 includes a pair of laterally spaced apart longitudinally extending rods 24 and a pair of laterally spaced apart, longitudinally extending tubular members 26 having offset, raised opposing end portions. The rods 24 and the tubular members 26 are secured to each other in any suitable manner along the lower central portions of the members 26.

At the rear end of the chassis 22 there is provided a pair of relatively large wheels 28 which are rotatably journaled on a transverse axle 30 which pases through a pair of brackets 32 extending downwardly from raised rear end portions of the members 26. The brackets 32 (FIG. 2) support a rear platform 34 by means of screws 36 or other equivalent fasteners. At the forward end of the central portions of the members 26 of the chassis 22 there is provided a pair of pivotable wheels or castors 38 that permit the cart 20 to be readily steered.

The castors 38 are mounted on a bar connected to and extending transversely across the bottom surface of the members 26. A forward platform 40 is mounted on the raised forward end portions of the members 26 at the forward end of the chassis 22 by means of conventional screws 42 or other equivalent fasteners. In addition, and for a purpose to be described hereinafter, a pair of L-shaped brackets 44 are disposed on the central portions of tubular members 26 of the chassis 22. Any suitable means, such as fasteners or the like, may be used to secure the rods 24 to the L-shaped brackets 44 which transversely extend across the members 26.

The rollable cart 20 also includes a pair of spacedly longitudinally opposed front and rear panels 46 and 48 and a side panel 50 to define three sides thereof. The fourth side is open as shown best in FIG. 2. The front and rear panels 46 and 48 extend upwardly from the chassis 22 and are provided with box-like, laterally spaced apart, turned-in side edges 52 and 54, respectively. The spaced apart, turned-out side edges 56 of the side panels 50 are L-shaped. As shown in FIG. 1, for example, each of the side edges 52 and 54 of the front and rear panels 46 and 48 are provided with a plurality of vertically spaced apart, L-shaped notches 58. The side edges 56 of the side panel 50 are also provided with a plurality of L-shaped notches 60.

Figure 5:
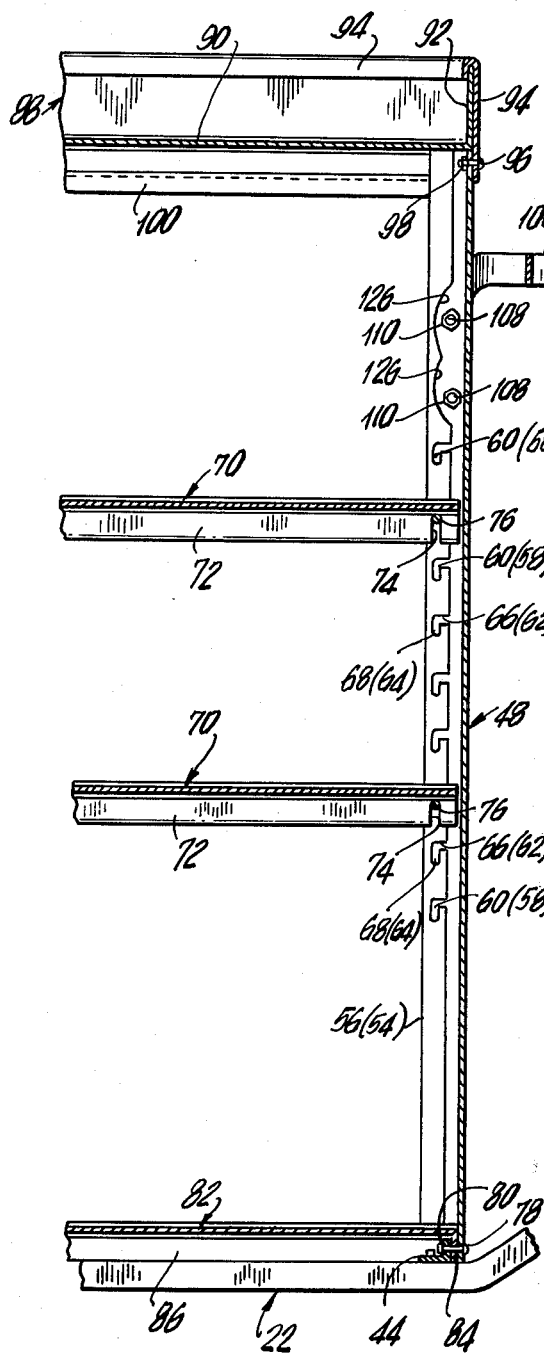
FIG. 5 is a fragmentary, sectional, elevational view taken along line 5—5 of FIG. 3.

The L-shaped notches 58 are formed in the inner, confronting walls of the box-like side edges 52 and 54 with a first leg 62 of each notch being open and extending horizontally and with a second leg 64 of each notch being contiguous with the first leg 62 but extending vertically downward as shown best in FIG. 5. Similarly, the notches 60 in the side panel 50 are provided with a first leg 66 of each notch that is open and extends horizontally and with a second leg 68 of each notch that is contiguous with the first leg 66 and which extends vertically downward. In the assembled condition, associated L-shaped notches 58 and 60 are registered in alignment with one another when one of the side edges 52 of the front panel 46 and one of the side edges 54 of the rear panel 48 are nested within the L-shaped side edges 56 of the side panel 50.

Figure 10:
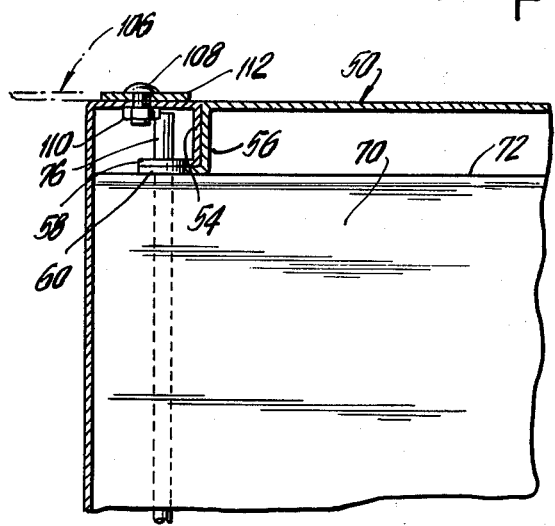
FIG. 10 is a fragmentary, sectional, elevational view taken along line 10—10 of FIG. 2.
Figure 10:
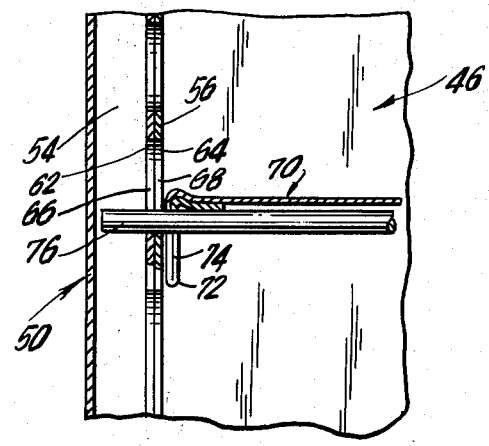

A plurality of shelves 70 are also provided. Each shelf 70 includes a pair of laterally spaced apart side edges 72 that extend longitudinally between the front and rear panels 46 and 48 and along the side panel 50. Proximate the front and rear ends of each of the side edges 72 there is provided a downwardly open, elongated U-shaped notch 74, as best shown in FIG. 10, which in the assembled condition, is in registry with the vertical legs 64 and 68 of the L-shaped notches 58 and 60, respectively. Coupling means in the form of elongated, transversely oriented bars 76 provide means for joining the front and rear panels 46 and 48 to the side panel 50 as well as adjustably supporting the shelves 70 so that the shelves 70 may be positioned at various heights above the chassis 22.

Figure 7:
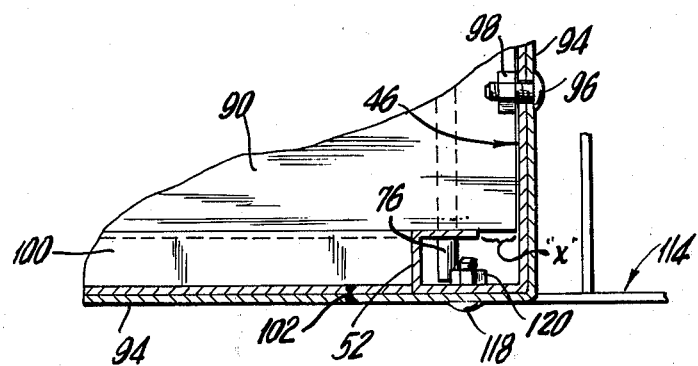
FIG. 7 is a fragmentary, sectional plan view taken along line 7—7 of FIG. 2.
Figure 3:
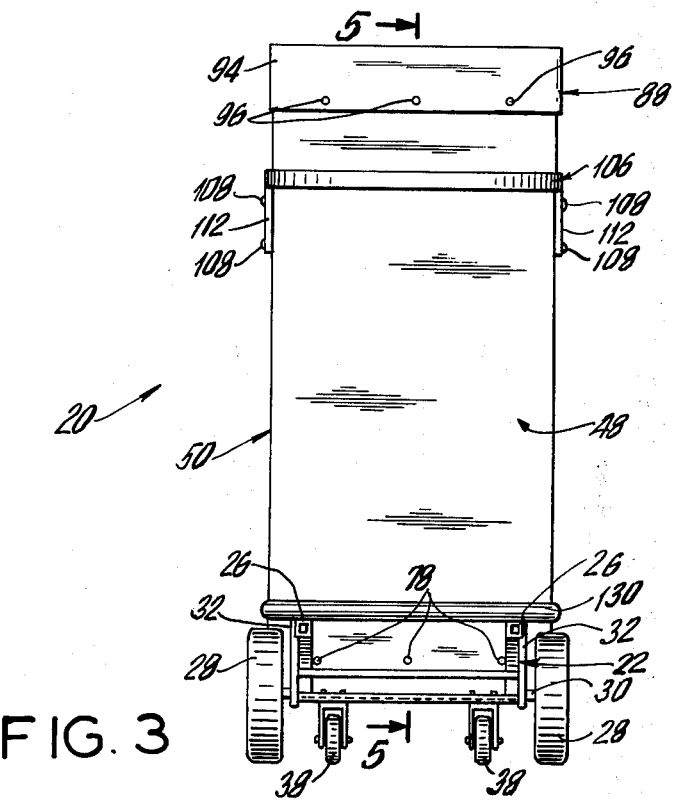
FIG. 3 is a rear elevational view of the rollable cart.
Figure 4:
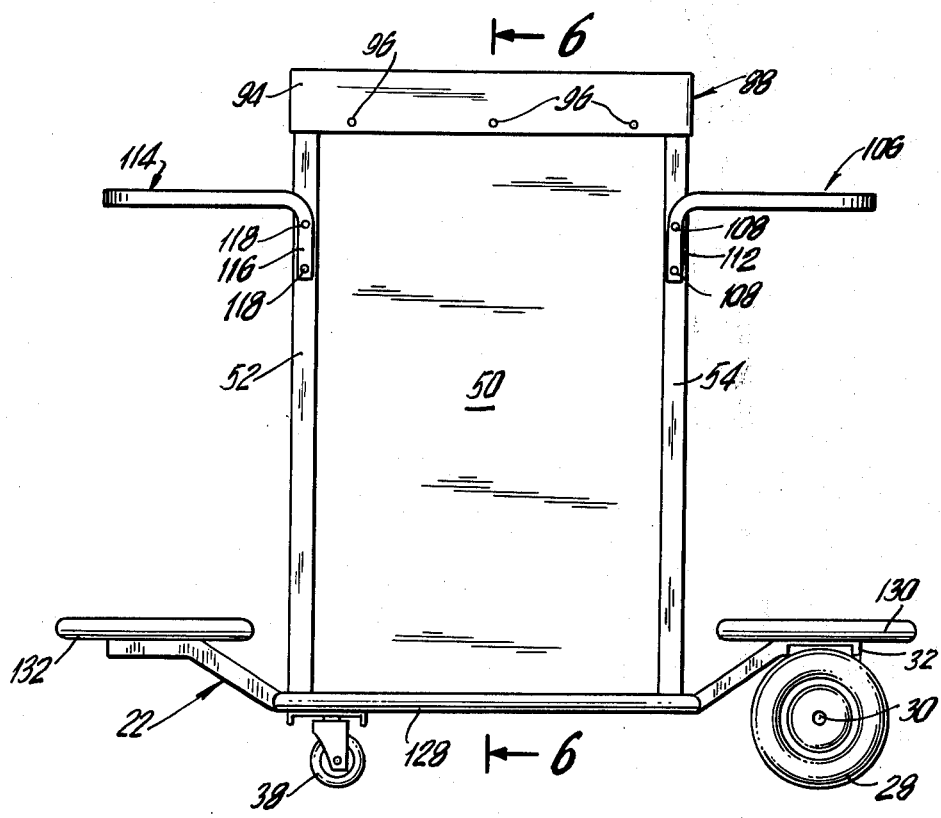
FIG. 4 is a right side elevational view of the rollable cart.
Figure 9:
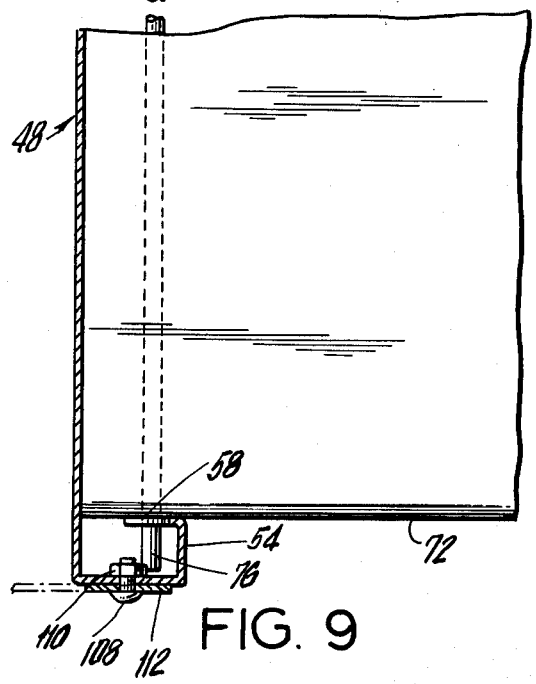
FIG. 9 is a fragmentary, sectional plan view taken along line 9—9 of FIG. 2.
Figure 11:
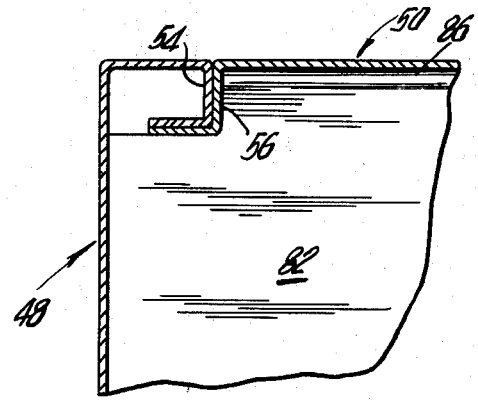
FIG. 11 is a fragmentary, sectional plan view taken along line 11—11 of FIG. 2.

As shown, for example, in FIGS. 1, 9 and 11, the innermost, confrontingly opposed legs of the box-shaped side edges 52 and 54 (in which the notches 58 and 60 are formed) are spaced from the main surface of the panels 46 and 48 by the dimension X shown in FIG. 7. This construction permits the bars 76 to be slipped into the space X so that they may enter the horizontal legs 62 and 66 of the L-shaped notches 58 and 60 before dropping into the vertical legs 64 and 68 of the L-shaped notches 58 and 60. When the ends of the bars 76 are positioned in the vertical portions of the notches 58 and 60 and because of the nesting arrangement discussed above, it will be appreciated that the front and rear panels 46 and 48 are effectively secured to the side panels 50 as shown in FIG. 10. The U-shaped notches 74 of each shelf 70 may then be placed on the transverse bars 76 in order to provide support means for the shelves 70. Thus, the combination of the L-shaped notches 58 and 60, the U-shaped notches 74 and the bars 76 provide means for coupling the front and rear panels 46 and 48 to the side panel 50 as well as means for supporting the shelves 70.

Figure 6:
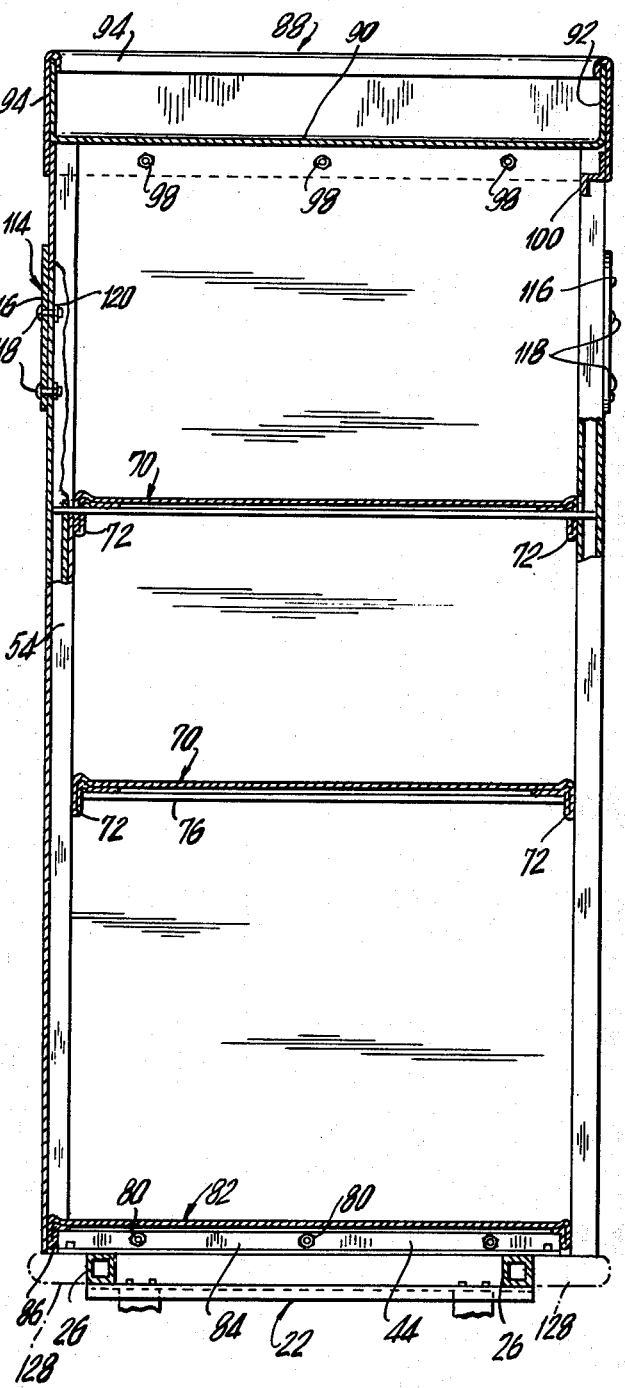
FIG. 6 is a fragmentary, sectional, elevational view taken along line 6—6 of FIG. 4.
Figure 8:
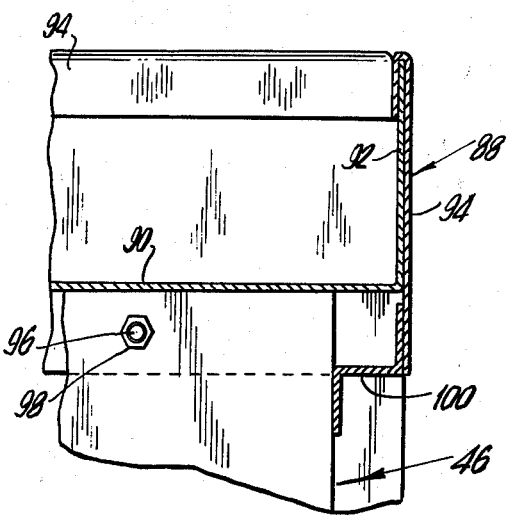
FIG. 8 is a fragmentary, sectional, elevational view taken along line 8—8 of FIG. 2.

The lower-ends of the front and rear panels 46 and 48 are secured to the L-shaped bars 44 and therefore to the chassis 22 by means of any suitable fasteners such as screws 78 and nuts 80. At the same time a bottom or base plate 82 having front and rear downwardly extending flanges 84 may be secured to the L-shaped brackets 44 and the chassis 22 using the same fasteners 78 and 80, as shown in FIGS. 5 and 6. The base plate 82 is also provided with a pair of laterally spaced apart, downwardly extending side flanges 86 that extend between the front and rear panels 46 and 48.

Figure 2:
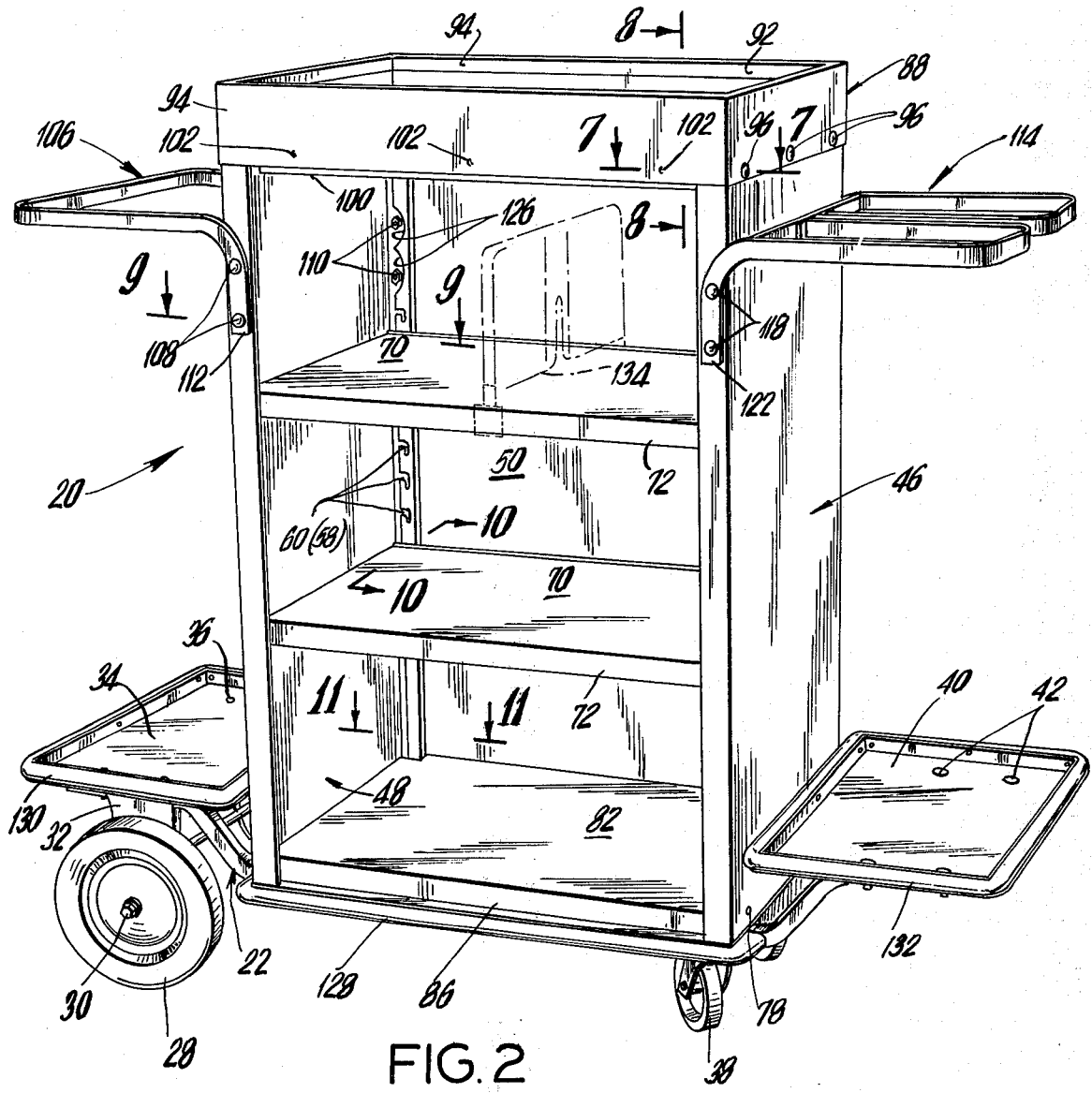
FIG. 2 is a perspective view of the rollable cart in an assembled position.

At its upper end, the rollable cart 20 is provided with a tray 88 having a top or base wall 90 and side walls 92. A peripheral, outer skirt 94 extends over the side walls and downwardly along the insides thereof as shown in FIGS. 5 and 6. The outer portion of the skirt 94 extends below the base wall 90. The tray 88 is secured to the front and rear panels 46 and 48 as well as to the side panels 50 by means of any conventional fasteners such as screws 96 and nuts 98. In order to rigidize the open side of the rollable cart 20 a Z-shaped bar 100 is riveted to the skirt 94 at locations 102 as indicated in FIGS. 2 and 7, or by using any suitable fasteners such as screws and nuts. It is noted that the position of the bars 76 can be changed to a different set of notches 58, 60 to adjust the height of the shelves 70 without removing the tray 88.

A handle 106 is secured to the upper end of the rear panel 48 using conventional fasteners such as screws 108 and nuts 110. The screws 108 pass through openings formed in the laterally spaced apart legs 112 of the handle 106 as well as registered openings 114 formed in the outermost section of the box-like side edges 54 of the rear panel 48. The handle 106 encloses an open area to define a horizontally extending loop-like configuration adapted to receive a top portion of a linen hamper bag (not shown) thereon, where the bottom of the bag may rest on the platform 34. Thus, the handle 106 functions as a linen hamper bag holder as well as a push handle.

Similarly, a hanger 114 having a pair of laterally spaced apart legs 116 is secured to the outermost section of the box-like side edges 52 of the front panel 46 using conventional fasteners such as screws 118 and nuts 120. The screws 118 pass through openings 122 formed in the legs 116 of the hanger 114 and openings 124 formed in the side edges 52 of the front panel 48. In order to facilitate the assembly of the handle 106 and the hanger 114, the side edges 52 and 54 of the front and rear panels 46 and 48 and the side edges 56 of the side panel 50 are notched as shown by reference character 126 in FIGS. 1 and 5.

The hanger 114 is split to enclose two open areas to define two loop-like configurations having a horizontal slot or opening centrally disposed between the horizontally extending loop-like members. One of the hanger loop-like members is adapted to receive and hold a top portion of a bag (not shown) for dry trash, with the other hanger loop-like member being adapted to receive and hold a top portion of a bag (not shown) for wet trash. Accordingly, the bottom of these trash bags may rest on the platform 40, if desired, depending upon the length of the trash bags. Furthermore, the slot or opening between the two hanger loop-like members provides a novel, convenient space used for storing an electric sweeper, brooms and the like, where the handle portion of the electric sweeper or broom is horizontally slipped into the hanger slot or opening, with the bottom portion of the electric sweeper or the broom resting on the platform 40. A cart, having a non-split loop-like hanger with only one enclosed open area, would require the electric sweeper or the broom to be lifted over the hanger and passed down therethrough in order to place the bottom portion of the electric sweeper or the broom on the lower platform for storage.

Resilient bumper means 128, 130 and 132 may be applied to the chassis 22 and to the platforms 34 and 40, respectively. An adjustable spacer 134 shown in phantom in FIG. 2 may also be mounted on the shelves 70. The bumper means 130 and 132 are connected to upwardly extending flanges disposed around the periphery of the platforms 34 and 40, respectively, to provide a peripheral rim on each platform.

It will be appreciated that the panels 46, 48 and 50 as well as the shelves 70, the base plate 82 and the tray 90 may be fabricated very simply in sheet metal using conventional equipment and techniques. Where appropriate they may also be molded of suitable plastic. Similarly, the handle 106 and the hanger 114 may also be fabricated using conventional equipment. The L-shaped bars 44, the transverse bars 76 and Z-shaped bar 100 may also be fabricated using conventional techniques. It will be further appreciated that the rollable cart 20 may be shipped in a knocked-down condition thereby minimizing freight costs which frequently are based on volume and not necessarily weight. The rollable cart 20 may then be readily assembled using conventional tools such as screw drivers and wrenches which require a minimum of skill.

There has been disclosed heretofore the best embodiment of the invention presently contemplated. However, it is to be understood that various changes and modifications may be made thereto without departing from the spirit of the invention.

What is claimed is:

1. A device comprising:
    a chassis having front and rear ends;
    a housing mounted on and extending upwardly from said chassis, said housing including opposed front and rear panels and a side panel extending therebetween, said front, rear and side panels each having a pair of upright, elongated side edges;
    at least one shelf mounted in said housing, said shelf extending along said side panel and longitudinally between said front and rear panels;
    securing means for coupling the side edges of said side panels to opposed side edges of said front and rear panels, said securing means also serving to adjustably support said shelf in said housing to permit said shelf to be selectively positioned at different heights above said chassis;
    said securing means including a plurality of L-shaped notches spaced apart along said side edges of said front, rear and side panels with a first leg of said L-shaped notches terminating and being open at said edge of each of said panels and with the second leg of each said L-shaped notches extending in the same direction as the upright edges of said panels;
    said L-shaped notches in said side panel being in registry with said L-shaped notches in said front and rear panels;
    side edges of said shelf having opposed, downwardly open notches proximate forward and rear ends thereof, said shelf notches being in registry with the second legs of said L-shaped notches; and
    said securing means further including elongated bars each having opposed ends which are removably positioned in said registered L-shaped and shelf notches, whereby said device is readily disposed in a knocked-down condition for shipping thereof.

2. A device according to claim 1, wherein there are a plurality of said shelves stacked one above the other.

3. A device according to claim 1, wherein said side edges of said front and rear panels are box-shaped and said L-shaped notches ae formed in inner, confrontingly opposed faces thereof.

4. A device according to claim 3, wherein said side edges of said side panel are L-shaped, one of said side edges of said front panel being nested in an associated one of said L-shaped side edges of said side panel and one of said side edges of said rear panel being nested in an associated other of said L-shaped side edges of said side panel.

5. A device according to claim 1, wherein there is further included a tray secured to said front, rear and side panels proximate upper ends thereof, said tray including a base wall disposed over said front, rear and side panels.

6. A device according to claim 1, wherein there is further included a bottom wall secured to said front, rear and side panels proximate lower ends thereof and to said chassis.

7. A device according to claim 1, wherein there is further included a platform secured to said chassis proximate at least one of said front and rear ends thereof.

8. A device according to claim 1, wherein there is further included handle means secured to said rear panel, said handle means enclosing an open area to define a loop-like push handle adapted to hold a linen hamper bag.

9. A device according to claim 1, wherein front and rear wheel means depend from said chassis to define a rollable cart, said front wheel means being pivotally secured to said chassis.

10. A device according to claim 9, wherein said front wheel means are smaller than said rear wheel means.

11. A device comprising:
    a chassis having front and rear ends;
    a housing mounted on and extending upwardly from said chassis, said housing including opposed front and rear panels and a side panel extending therebetween, said front, rear and side panels each having a pair of upright, elongated side edges;
    hanger means secured to said front panel, said hanger means including two horizontally extending loop-like members enclosing two open areas respectively adapted to hold a trash bag on each of said two loop-like members, said two loop-like members being horizontally spaced apart to provide an opening for horizontally receiving a handle portion of an electrical sweeper, a broom and the like;

at least one shelf mounted in said housing, said shelf extending along said side panel and longitudinally between said front and rear panels; and securing means for coupling the side edges of said side panels to opposed side edges of said front and rear panels, said securing means also serving to adjustably support said shelf in said housing to permit said shelf to be selectively positioned at different heights above said chassis, whereby said device is readily disposed in a knocked-down condition for shipping thereof.

12. A device according to claim 11, wherein there are a plurality of said shelves stacked one above the other.

13. A device according to claim 11, wherein there is further included a tray secured to said front, rear and side panels proximate upper ends thereof, said tray including a base wall disposed over said front, rear and side panels.

14. A device according to claim 11, wherein there is further included a bottom wall secured to said front, rear and side panels proximate lower ends thereof and to said chassis.

15. A device according to claim 11, wherein there is further included a platform secured to said chassis proximate at least one of said front and rear ends thereof.

16. A device according to claim 11, wherein there is further included handle means secured to said rear panel, said handle means enclosing an open area to define a loop-like push handle adapted to hold a linen hamper bag.

17. A device according to claim 11, wherein front and rear wheel means depend from said chassis to define a rollable cart, said front wheel means being pivotally secured to said chassis.

18. A device according to claim 17, wherein said front wheel means are smaller than said rear wheel means.

* * * * *